United States Patent [19]

Wall

[11] Patent Number: 4,790,484
[45] Date of Patent: Dec. 13, 1988

[54] APPARATUS FOR DISTRIBUTING GRANULAR MATERIAL

[75] Inventor: George B. Wall, Delhi, Iowa

[73] Assignee: Highway Equipment Company, Cedar Rapids, Iowa

[21] Appl. No.: 922,014

[22] Filed: Oct. 22, 1986

[51] Int. Cl.[4] ............................................. A01C 15/04
[52] U.S. Cl. .................................... 239/655; 198/540; 239/168
[58] Field of Search ..................... 239/163, 8, 166–168, 239/654–655, 168; 222/617, 630; 198/540, 640

[56] References Cited

U.S. PATENT DOCUMENTS

| | | | |
|---|---|---|---|
| 2,329,331 | 9/1943 | Brosener | 239/168 X |
| 2,641,505 | 6/1953 | Vubis | 239/168 |
| 2,781,229 | 2/1957 | Thornberg | 239/168 X |
| 3,223,330 | 12/1965 | La Plante | 239/168 |
| 3,606,097 | 7/1969 | Wall | 239/654 |
| 4,020,991 | 5/1977 | Dreyer | 239/655 |
| 4,138,063 | 2/1979 | Batts | 239/168 |
| 4,394,968 | 7/1983 | Tyler | 239/167 |
| 4,489,892 | 12/1984 | Tyler | 239/655 X |
| 4,562,968 | 1/1986 | Widmer et al. | 239/655 |

Primary Examiner—Andres Kashnikow
Assistant Examiner—Kevin P. Weldon
Attorney, Agent, or Firm—James C. Nemmers

[57] ABSTRACT

Spreading apparatus for attachment to a vehicle for distributing granular materials such as fertilizer and the like, using air as the distributing medium. The spreading apparatus includes a rear-mounted boom and an air system in which the material distribution passageways are substantially straight from the discharge of the fans to the point of material introduction to the discharge nozzles along the boom. This is achieved by the use of two blowers that move air in opposite directions through a cross-over tube array into which the already-divided material is introduced into individual air passageways leading to the discharge nozzles mounted along the boom. The boom itself is designed so that it can be quickly and easily folded and pivoted for storage or transport.

10 Claims, 5 Drawing Sheets

APPARATUS FOR DISTRIBUTING GRANULAR MATERIAL

BACKGROUND OF THE INVENTION

The invention relates to an apparatus for use in the agricultural field for spreading powdered or granular substances such as fertilizer or chemicals, onto a field. The invention also relates to an apparatus for distributing seeds onto a field.

To achieve improved productivity and yields, modern agricultural practices utilize fertilizers, pesticides and other chemicals which must be applied to the fields or the crops grown in the fields. Such substances are commonly applied utilizing a vehicle or a towed implement which has a hopper or box for carrying the material to be distributed and a distribution means. There are a variety of types of distribution means known and commercially used. For example, spinner mechanisms have been used in which a rotating spinner is positioned near a controlled discharge opening from the box containing the substance to be distributed. As the substance strikes the spinner, it is thrown outwardly. However, this type of apparatus is less than ideal for a material that varies in particle size since the larger particles will be thrown a greater distance. Commonly, blended materials must be distributed, and spinner type machines may produce patterns of distribution that are chemically unacceptable. Also, spinner type machines are susceptible to wind-produced pattern errors, as well as errors in distribution patterns produced by the rolling motions of the vehicle. Spinner-type distributing machines are also highly susceptible to errors of the vehicle operator since there is not any practical way to mark the path where the material has been distributed. This may result in excessive overlap or bands over which no material has been distributed. In addition, spinner-type machines are not well suited to grain seeding applications, particularly to low seeding rates of fine seeds.

There are also known and used boom-type spreaders in which a boom is mounted at the rear of the vehicle transversely to the direction of travel. These boom-type spreaders generally carry the material through the boom by a mechanical conveyor, such as an auger. The material is then dropped from the boom through spaced openings. Machines of this type are mechanically complex and are prone to maintenance problems. They are also susceptible to wind-produced errors since the material free-falls usually a distance of five to six feet. Also, the boom-type mechanical spreaders are totally unsatisfactory for distributing materials that are a blend of different particle sizes since the larger particles will be carried to the outer end of the boom while the fines are dropped along the inner portions of the boom. The same disadvantage occurs for non-blended products unless particle size is closely controlled. Moreover, boom-type mechanical spreaders are not suitable for seeding work, particularly the seeding of small seeds at low rates.

To overcome the difficulties of the spinner-type and boom-type mechanical spreaders, there have been developed distribution systems in which air is used as the distributing medium. There are a number of air spreaders which are known and commercially used, and their capability and effectiveness depends on the particular design. An early such design is shown in U.S. Pat. No. 3,606,097. Air spreaders generally require more power than other types of distribution systems, and especially critical is the design of the air system. Each time that the air stream makes a turn, this adds significantly to power requirements. Moreover, the path of the material being carried by the air stream should always be level or downward, since conveying material upwardly with an air stream requires a large amount of power.

There are two overall configurations of air spreaders that are known and used. One such configuration mounts the distribution boom toward the middle of the vehicle ahead of the material hopper while the other configurations mounts the boom at the rear of the vehicle. Although the configuration in which the boom is mounted forwardly of the material storage hopper provides better weight distribution and better vision by the operator, midship mounted booms require an additional rear mounted center section and also will leave a "dead spot" at the corners of the fields.

Rear mounted booms of known air spreaders generally have complex material distribution systems in an attempt to introduce the material evenly into the air stream to provide uniform distribution patterns. Air spreading machines which attempt to divide the material that is already moving in the air stream are not satisfactory and provide unsatisfactory distribution patterns. Other distribution configurations attempt to mechanically convey the material from the material hopper and mechanically divide the material before it enters the air stream. Examples of such distribution systems are shown in U.S. Pat. Nos. 4,462,550, 4,475,819 and 4,489,892.

There are other desirable features of air distribution systems which prior art systems have been unable to achieve satisfactorily. Particularly in rolling fields, it is highly desirable to have the ability to raise or lower each half of the boom independently of the other. Also, the booms must be designed so as to be positioned out of the way during over the road transportation and during storage of the vehicle without elevating the boom to an undesirable height while still maintaining the boom at an optimum spreading height. No known boom-type air spreaders have been able to achieve this without complicating the air distribution system.

There is therefore a need for an improved apparatus for spreading a variety of granular and powdered products utilizing air as the conveying medium, which improved apparatus will overcome the deficiencies of known apparatus of this type.

SUMMARY OF THE INVENTION

The invention is for an air spreader in which the boom is rear mounted. In the invention, the material is controllably discharged from the material hopper of the vehicle and divided at the point of discharge for introduction into independent air streams. This is accomplished by the use of two fans or blowers that are positioned so as to move air in opposite directions generally transversely to the direction of movement of the vehicle. These fans provide air movement through substantially straight air tubes positioned beneath the material discharge so as to receive the material directly into the air streams and carry it through straight paths to spaced discharge points along the booms that extend outwardly from each side of the vehicle. This is accomplished by a unique cross-over type air distribution head in which independent air tubes alternately extend in opposite directions leading to the discharge points on the booms extending from opposite sides of the vehicle. Although the booms are pivotally mounted so as to be close to the ground for optimum spreading patterns, the entire boom structure is pivotally mounted on the rear of the vehicle so as to allow the entire boom structure to be pivoted upwardly while the outer ends of the booms are then pivoted forwardly for transport. This pivoting structure allows the air distribution tubes to remain connected and sealed at all times and provides for substantially straight air paths while the material is being distributed.

Because of the pivoting structure and the material distribution arrangement, the spreader of the invention can be retrofit to existing vehicles, and when fit to vehicles of the spinner type, a spinner unit can be quickly and easily installed without removal of the boom structure. This permits a single vehicle to be used for both types of distribution systems.

DESCRIPTION OF THE PREFERRED EMBODIMENT OF THE INVENTION

Figure 1:
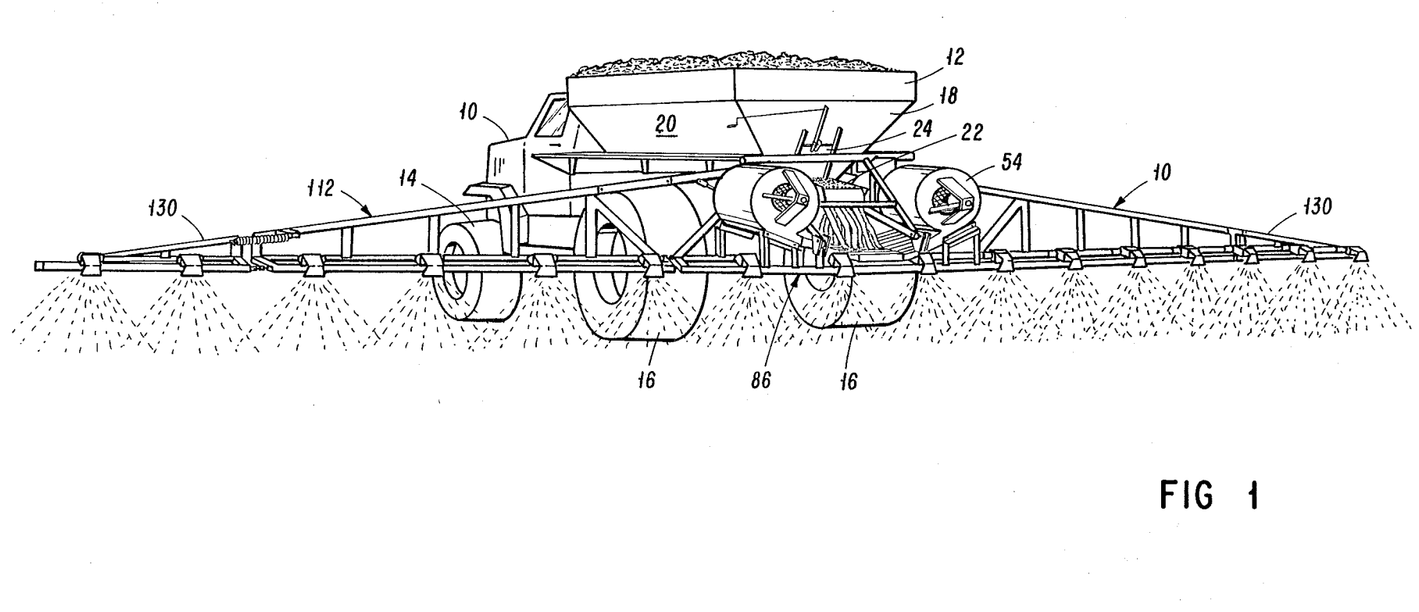
FIG. 1 is a perspective view of a vehicle showing the distribution system of the vehicle with the boom extended for distribution.

Referring to FIG. 1, there is illustrated a distribution system constructed according to the principles of the invention attached to a standard vehicle of the type commonly used for applying granular fertilizers, pesticides, herbicides, etc. The vehicle is of the usual type having a cab 10 and a material containing hopper or box 12 rearwardly of the cab, with the cab 10 and box 12 mounted on front wheels 14 and rear wheels 16 which are preferably of the flotation type so that the vehicle can be driven over the fields to which the material is to be applied.

The box 12 generally has a front wall (not shown) and a rear wall 18 that are joined by downwardly sloping side walls 20. The material to be distributed is contained in the box 12, and it is commonly discharged by a conveyor, such as a belt-conveyor 22, extending beneath the box 12. The material is conveyed to the rear by conveyor 22, and the amount of material discharged by conveyor 22 is controlled by a vertically movable gate 24 the position of which is adjusted by turning handle 26 (see FIG. 3). The material being conveyed rearwardly by conveyor 22 is commonly restrained by side plates 28 (see FIG. 4) so that all of the material being carried by conveyor 22 will be discharged from its rearmost end.

Figure 3:
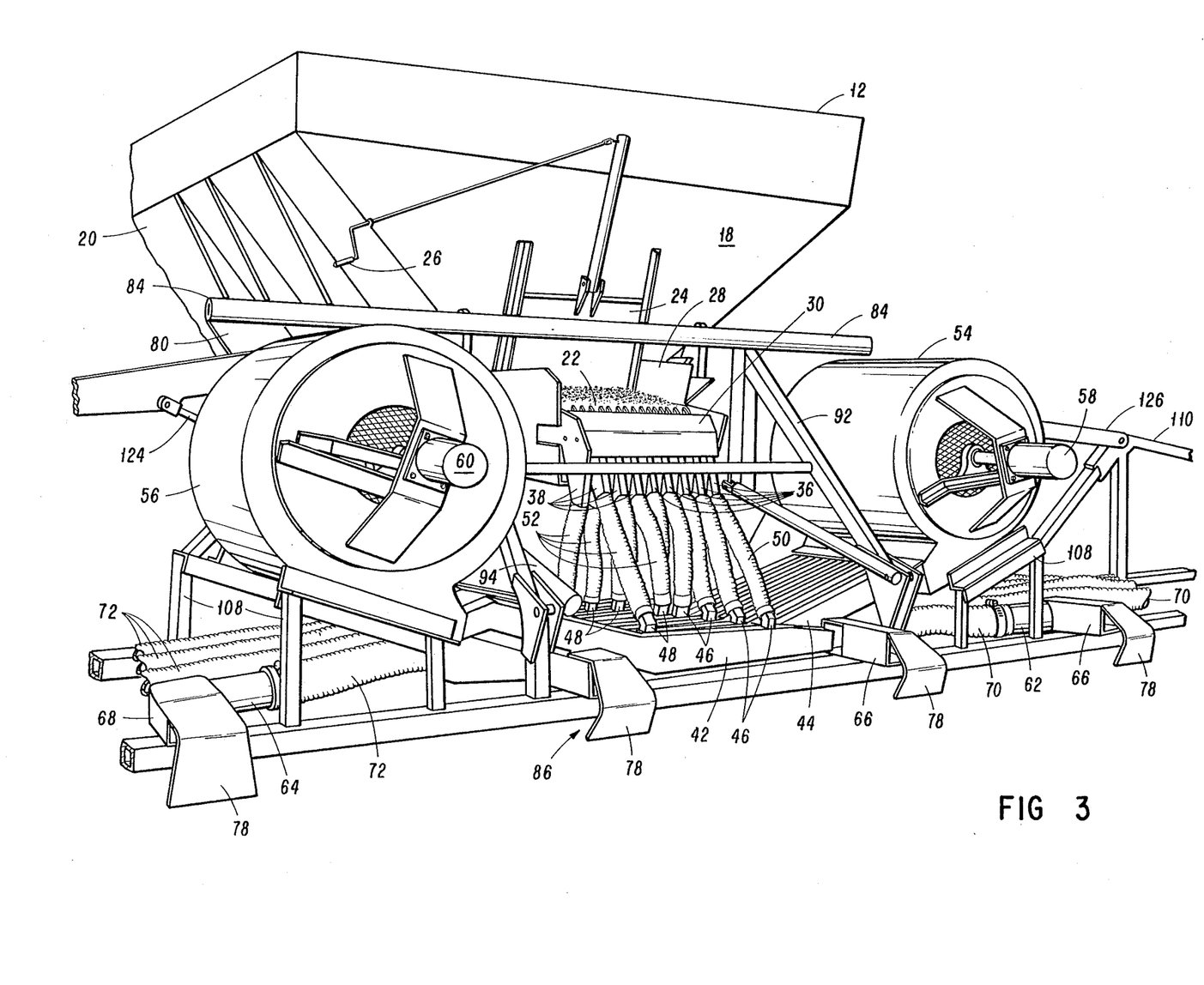
FIG. 3 is a perspective view of the distribution system showing the cross-over distribution head and air moving means.
Figure 4:
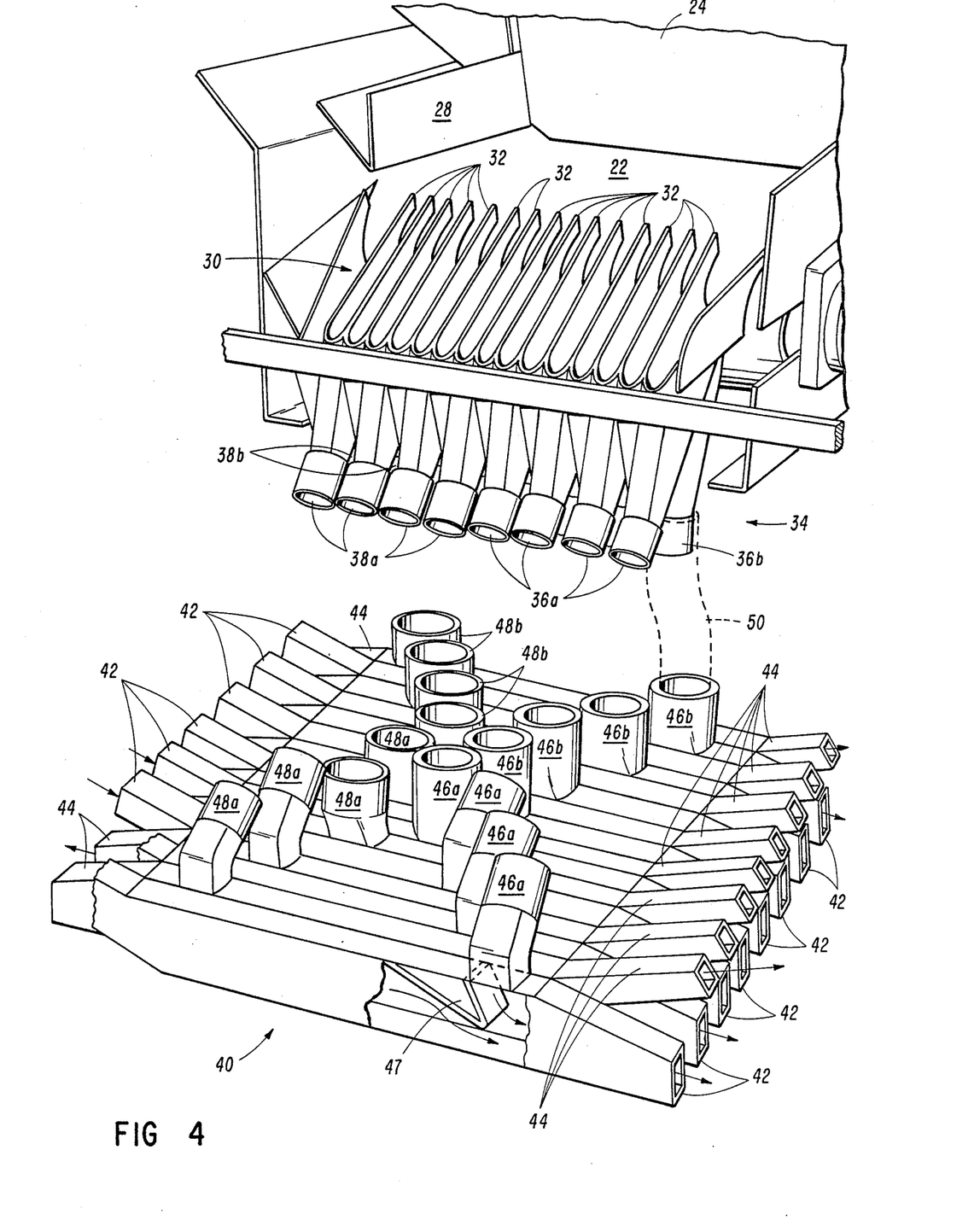
FIG. 4 is a perspective view of a portion of the distribution system showing the manner in which the material to be distributed is divided and introduced into the cross-over air distribution head.

Referring now particularly to FIGS. 3 and 4, the distribution system will be described. The supporting framework for the boom and its mounting on the vehicle will be described subsequently. At the discharge end of conveyor 22 and in between the side plates 28 is a set of material dividers 30. These dividers include forwardly extending plates 32 which are parallel to each other and vertically oriented and extend forwardly over the top of the conveyor 22 so as to receive and divide the material being carried by conveyor 22 and direct that material into a plurality of material conveying tubes indicated generally by the reference numeral 34. As best seen in FIG. 4, alternate ones of the tubes 34 extend either rearwardly or forwardly, and the right side rearward extending tubes are each designated by the reference numeral 36a, while the right side forward extending tubes are each designated by the reference numeral 36b. Similarly, the left side rearward extending tubes are each designated by the numeral 38a, and the left side forward extending tubes 38b. Thus, the material dividers 30 form a plurality of side-by-side compartments alternate ones of which lead to the rearwardly extending tubes 36a and 38a while the remaining alternately spaced compartments communicate with the forwardly extending tubes 36b and 38b.

Positioned beneath the divider arrangement is a cross-over tube array indicated generally by the reference numeral 40. Referring to FIG. 4, tube array 40 is comprised of a plurality of air tubes 42 and 44. Tubes 42 provide for air flow to the right side while tubes 44 provide air flow to the left side. It will be noted that tubes 42 and 44 alternate across the tube array 40.

Tubes 42 and 44 are welded or otherwise attached together to form tube array 40 and provide separate and independent passages for the flow of air in the directions of the arrows shown on FIG. 4 and as hereinafter described.

Each air tube 42 has a material inlet 46a or 46b. Each material inlet 46a is connected to a rearward extending material conveying tube 36a, while each material inlet 46b is connected to a forward extending material conveying tube 36b. Similarly, each material inlet 48a is connected to a rearward extending material conveying tube 38a, while each material inlet 48b is connected to a forward extending material conveying tube 38b. As best seen in FIG. 3, connection between material conveying tubes 36 and the material inlets 46 is by flexible tubes 50, while connection between the material conveying tubes 38 and the material inlets 48 is by similar flexible tubes 52. With this arrangement, the material to be distributed is divided by the material dividers 30 into the compartments formed by plates 32 (FIG. 4), from where the material passes into one of the tubes 36 or 38, down through flexible tubes 50 or 52 and then into the air tubes 42 or 44. It will be evident that the material is substantially uniformly divided by the material dividers 30 as it is discharged from conveyor 22, and that equal amounts of the material will be introduced into each of the air tubes 42 and 44. Thus, the distribution system of the invention, without any additional moving parts, provides for substantially equal division of the material to be spread into the various air tubes which, as described hereinafter, lead to the discharge nozzles spaced along the booms. This is accomplished in the invention without complex material conveying components such as augers, elevators, holding compartments, mechanical dividers, etc. and related drive components which all known prior art machines must employ. This results in a considerable saving in power requirements and reduces maintenance problems as well as producing cost savings in manufacturing the spreader. Moreover, by using a conveyor (or other material feeder) that has multiple belts that are independently operated together with corresponding independent sections of gate 24, the system of the invention provides for restricting selected portions of material flow to the booms. This is a very desirable capability since in practically all spreading application the final passes will be made over a portion of the field that is less than a boom width.

The cross-sectional area of each tube 42 or 44 is essentially constant throughout it's length except for a "bell mouth" entry to each tube from the air plenum chamber which is a part of each housing for fans 54 and 56 (FIG. 3). However, at a point immediately upstream from each material inlet (46a and 46b or 48a and 48b) in the tube array 40 is a false top section 47 inserted into the rectangular tubes 42 and 44 and inclined downwardly in a downstream direction (see FIG. 4). The constriction thus provided forms a venturi which creates a pressure somewhat less than atmospheric in each material inlet and aids in moving materials into the air stream of tubes 42 and 44.

Figure 2:
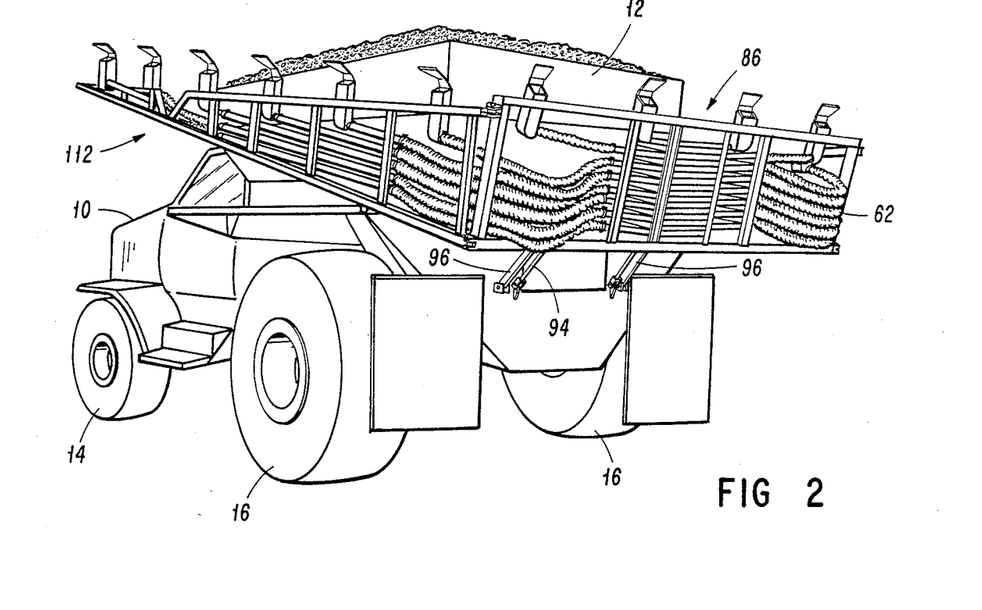
FIG. 2 is a perspective view showing the distribution system of the invention with the boom pivoted into a transport position.

Referring now to FIG. 3, there are shown two fans or blowers 54 and 56 which are driven by hydraulic motors 58 and 60 respectively. Any suitable air moving means can be employed. The inlet ends of the air tubes 42 are connected to the discharge of blower 56 while the inlet ends of air tubes 44 are connected to the discharge of blower 54. Thus, blower 54, which is mounted on the right side of the spreader, moves air through the air tubes 44 leading to the left boom while the blower 56 which is mounted on the left side of the spreader moves air through the air tubes 42 extending to the right boom of the spreading apparatus. As best seen in FIG. 3, an air tube 62 is connected to each of the air tubes 42 of the tube array 40, and air tubes 62 extend to the right along the supporting boom to one of the discharge nozzles 66 which are spaced along the supporting boom in a staggered fashion as shown in FIGS. 1 and 2. Similarly, air tubes 64 are connected to the air tubes 44 of the tube array 40 and extend to the left along the supporting boom and are connected to the discharge nozzles 68 which are similarly spaced along the supporting boom in a staggered fashion as shown in the drawings. As best seen in FIG. 3, portions 70 of tubes 62 are flexible so as to permit the booms to be folded in the manner described hereinafter. Similarly, portions 72 of air tubes 64 are made of flexible material to permit the boom on that side of the vehicle to also be folded for transport. In a similar manner, air tubes 62 have flexible portions 74 near the outer end of the boom (see FIG. 6) to provide a break-away feature that is also described hereinafter. In like manner, air tubes 64 have flexible portions at the outer ends of two of the tubes to provide for the break-away feature. As an alternate to the flexible portions 74, butt-type connections with air seals could be employed.

Each of the discharge nozzles 66 and 68 has a deflector plate 78 that will deflect the material being discharged from the nozzles downwardly and transversely in both directions. If desired, the angle of deflector plates 78 can be varied from that shown to assure a correct and accurate spread pattern. Also, as best seen in FIG. 2, the discharge nozzles 66 and 68 are not aligned on a transverse lien, but are staggered forwardly of each other so that the material discharged from each of them does not physically impinge upon the material from adjacent nozzles thereby minimizing the possibility of spread pattern distortions.

Figure 5:
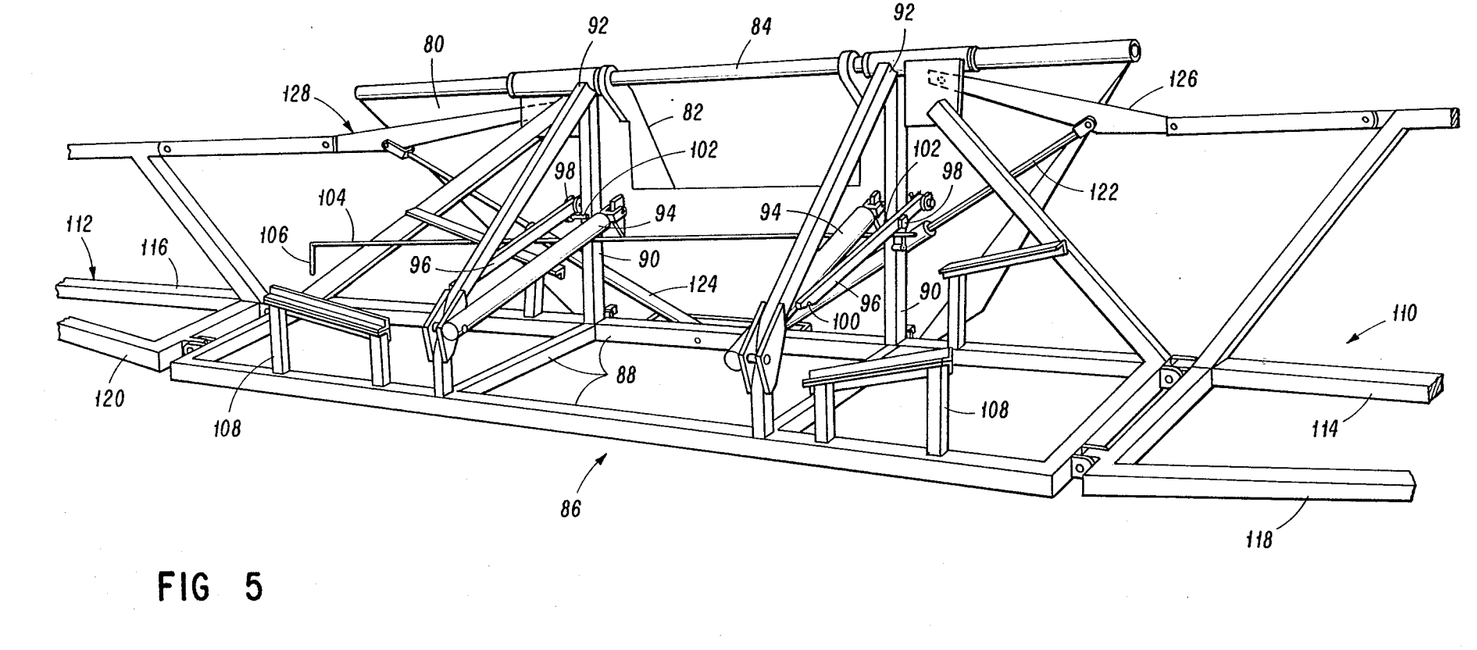
FIG. 5 is a perspective view of the supporting structure for the distribution means and showing all of the actual air and material distribution components removed so as to illustrate the mounting and locking mechanism for the boom structure.
Figure 6:
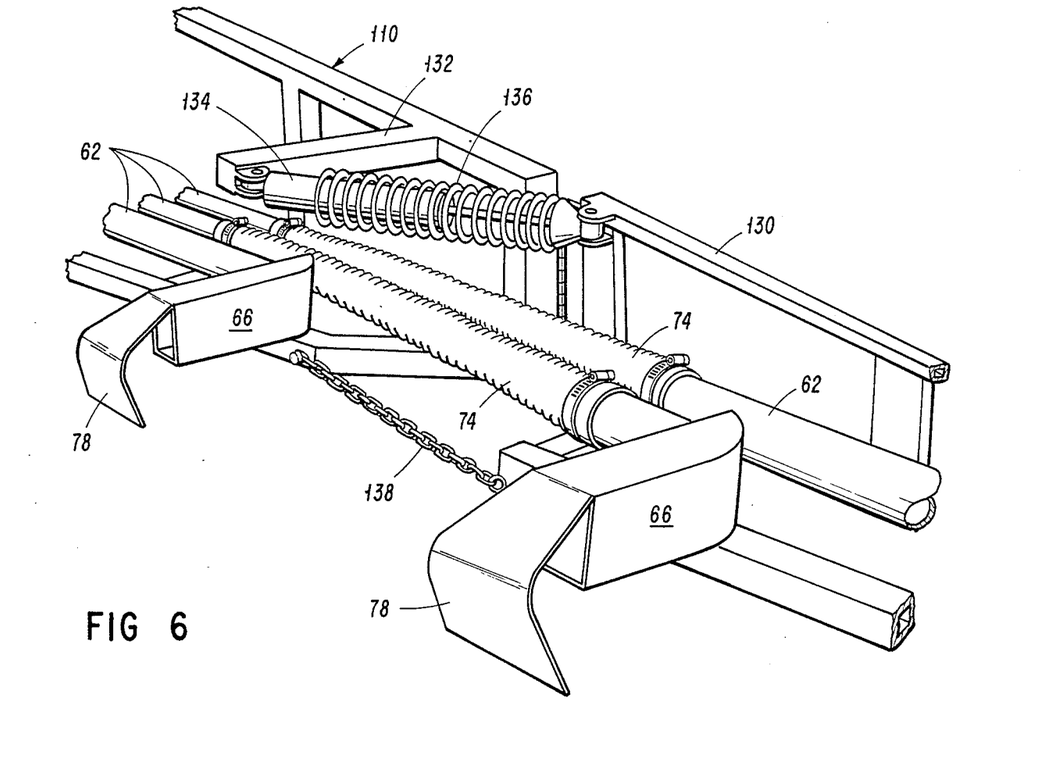
FIG. 6 is a perspective view of a portion of the outer end of one of the booms illustrating the break-away feature of the boom structure.

The mounting and supporting structure for the material distribution system will now be described with particular reference to FIGS. 5 and 6. FIG. 5 illustrates the supporting framework and pivoting structure along with the hydraulic means for pivoting and folding the booms. The outermost ends of the booms are not shown in FIG. 5, but are clearly shown in FIGS. 1, 2 and 6, the latter illustrating the break-away feature more fully described hereinafter. The mounting structure for the air distribution system of the invention is designed such that it can be installed on existing units which have a material storage box and a rear discharge conveyor. Numerous ones of these units are currently used commercially, many of them with spinner-type distributors on the rear. One feature of the invention is that the air distribution system can be installed on these standard units. Of course, when the air distribution system of the invention is used, the spinner-type distributor will have to be removed. However, as will be evident from the pivotal mounting described hereinafter, with the air distribution system of the invention in the transport or storage position shown in FIG. 2, a spinner-type distributor could be mounted in its customary position on the rear of the vehicle without the necessity of removing the air distribution system of the invention. This thus allows a single vehicle to be used for both distribution systems, and permits the air distribution system of the invention to be retrofit to existing units without additional material, conveying, elevating or metering equipment.

Referring now to FIG. 5, a main support plate 80 is provided which is attached to a subframe which in turn is mounted between box 12 and the frame of the vehicle by welding and other suitable attachment means. Support plate 80 has an opening 82 in its center through which the rear of the conveyor 22 extends. At the upper end of the main support plate 80 is a horizontal support bar 84 that extends transversely across the rear of the vehicle. Pivotally secured to the support bar 84 is a central boom section indicated generally by the reference numeral 86. This central section 86 has a lower rectangular framework 88 that would be generally parallel to the ground when the structure is in the spreading position shown in FIG. 1. The lower framework 88 is pivotally connected to the support bar 84 by a pair of parallel spaced-apart vertical supports 90 (FIG. 5) that are affixed to the forward portion of the framework 88, and a pair of rearwardly and downwardly extending supports 92. A pair of hydraulic cylinders 94 are pivotally connected to supports 92 and the operating rods of the cylinders 94 are pivotally connected to the main support plate 80. Thus, when the hydraulic cylinders 94 are actuated, the central boom section 86 will be swung upwardly to the storage or transport position as shown in FIG. 2. As a safety locking mechanism, a pair of safety bars 96 are pivotally mounted on the main support plate 80, and are supported and slidable in supports 98 affixed to the vertical supports 90 as best seen in FIG. 5. Each of the safety bars 96 has a notch 100 in its outer end, and each of the vertical supports 90 has a locking pin extending outwardly. Thus, as the boom section 86 is pivoted upwardly, the safety bars 96 will slide through the supports 98 until the notches 100 engage the locking pins 102 which are a part of the structure of support 98. This will hold the boom in the storage or transport position shown in FIG. 2. In order to release the locking mechanism, a release bar 104 with a handle 106 is provided which when turned will disengage the notches 100 from the locking pins 102 and permit the hydraulic cylinders 94 to lower the boom section 86 to the operating or spreading position shown in FIG. 1.

The central boom section 86 also has fan supports 108 on each side thereof to support the blowers 54 and 56.

As seen in FIG. 2, the entire boom structure is in sections and is foldable. Thus, secured to the outer ends of the central boom section 86 are right and left boom sections 110 and 112 respectively. The boom sections 110 and 112 have outwardly extending forward support members 114 and 116 respectively and rearward support members 118 and 120 which converge toward the forward sections. It is these rearward sections 118 and 120 which provide the supports for nozzles 66 and 68. Due to the fact that the rearward supports 118 and 120 converge toward the forward supports 114 and 116, the discharge nozzles 66 and 68 are not aligned but rather are staggered forwardly of each other. As previously indicated, this minimizes contact of the granular material being discharged from adjacent nozzles thus minimizing the possibility of spread pattern distortion.

The right boom section 110 and the left boom section 112 can each independently be swung upwardly with respect to the central boom section 86. This independent operation is provided by separate hydraulic cylinders 122 for the right section 110 and 124 for the left section 112. As best seen in FIG. 5, hydraulic cylinder 122 is connected to the right boom section 110 by a linkage arrangement 126, and similarly the hydraulic cylinder 124 is connected to the left boom section 112 by a linkage arrangement 128. The linkage arrangements 126 and 128 are pivotally connected to the main support plate 80 so that when the hydraulic cylinders 122 and 124 are actuated, the corresponding right boom section 110 or left boom section 112 will be raised. Because of the flexible portions 70 and 72 of the air tubes 62 and 64, pivoting of the right and left boom sections 110 and 112 is permitted. Also, note that when the sections are in the operating position shown in FIG. 1, the air tubes will be substantially straight. Note also from FIG. 2 that when the right or left boom sections 110 and 112 are folded for storage or transport, the air tubes are not twisted but are bent on angles substantially transverse to their axes. The independent pivoting of each of the right and left boom sections 110 and 112 is a highly desirable feature when the unit is being operated in rolling fields where the situation may result in a boom digging into the ground on one side while the opposite side is high in the air. Thus, the booms can be adjusted to conform to the contour of the field over which the material is being spread, and this can be done without disrupting adversely the air flow through the air tubes. Very few prior art spreaders can accomplish this and none with the simplicity of the structure of the invention.

It should be noted further that because of the mounting arrangement for the distribution system of the invention, the discharge nozzles 66 and 68 are at an optimum spreading height while the pivoting and folding arrangement of the booms allows the proper transport position with the tips of the booms at a minimum height.

One further advantage to the boom design is that the entire boom is pivoted around the support bar 84 through an angle of approximately 75° when the boom is moved from an operating to a transport position. However, the cylinders 122 and 124 and the connecting linkage 126 and 128 to the right and left boom sections 110 and 112 are also rotated through the same angular change. Thus, the same control system which is used to raise and lower the right and left boom sections 110 and 112 for pitch control also is used to fold the right and left boom sections 110 and 112 for storage and transport. This means that one control system can be used for two different functions, thus adding to the simplicity, reliability and economy of the overall design.

One additional feature of the boom structure is illustrated in FIG. 6. With booms extending outwardly to the sides the distances required for efficient spreading, it is frequently difficult for the operator of the spreader to avoid striking obstructions especially when making turns in the corners of fields, etc. To minimize damage to the booms, a break-away feature is shown in FIG. 6. Each of the right and left hand boom sections 110 and 112 are provided with this feature, but FIG. 6 shows only the right hand section 110. A similar feature would be included on the left boom section 112. In FIG. 6, the outermost section 130 of right boom section 110 is pivotally connected as shown. A rearwardly extending support 132 provides for attachment of a shock absorber 134 which will permit the outermost section 130 to swing relative to the section 110 if it strikes an object. The spring 136 that forms a part of the shock absorber 134 will see that the outermost section 130 returns to its normal operating position aligned with the remainder of the boom after the obstruction is passed. Chain 138 or other suitable stop is provided to limit the forward travel of the boom at the safety break hinge point. Note also from FIG. 6 that the flexible portions 74 of the air tubes 62 are provided to permit the relative pivoting between the outermost section 130 and the right section 110.

The operation of the air distribution system of the invention should be evident from the foregoing description of the various components of it. It will be evident from this description and the operation of the system that the system is vastly improved prior art systems in many respects. All of the air tubes carrying material are substantially straight from the air moving means to the discharge nozzles. This minimizes horsepower and turbulence and contributes to more uniform spread patterns. Because of the cross-over tube array 40 that utilizes two fans combined with the standard conveyor 22 of the spreader, the material to be spread is uniformly divided and distributed without the necessity of complex distribution hoppers and mechanisms. Also, since the conveyor 22 is ground-speed controlled as is well known on units of this type, there is no necessity for any additional mechanism to coordinate the spreading rate with the speed of the vehicle. The spreading rate is automatically and accurately controlled resulting in an extremely simple and very reliable distribution system. There will thus be an immediate response in the spreading rate to changes in the vehicle's speed. Lag time is minimal because the material discharged from the ground-speed controlled conveyor 22 is immediately introduced into the air streams and spread onto the ground.

The many other advantages of the air distribution system as well as the boom design itself and its unique method of folding and storage have already been described. This coupled with the fact that the design permits the usage of the air distribution system of the invention as an attachment which can be fitted to existing machines, clearly points up the economy of the design as well as its simplicity and reliability. Having thus described the invention in connection with the preferred embodiment thereof, it will be evident to those skilled in the art that various revisions and modifications can be made to the embodiment described herein without departing from the spirit and scope of the invention. Obviously, a variety of air moving means and a variety of specific boom designs from the structural standpoint can be made. It is my intention however that all such revisions and modifications as are obvious to those skilled in the art will be included within the scope of the following claims.

What is claimed is:

1. Spreading apparatus for distributing material and adapted to be mounted on, a vehicle of the type having storage means for the material to be distributed and means for conveying the material from the storage means and discharge unit, said apparatus comprising a boom assembly moveable from a spreading position to a transport position, said boom assembly including a central section, a right section extending outwardly from the right side of the vehicle and transversely of the direction of movement of the vehicle, a left section extending outwardly from the left side of the vehicle and transversely of the direction of movement of the vehicle, each of the right and left sections being pivotally connected to the center section about an axis that is generally horizontal when the boom assembly is in a spreading position, each of the right and left sections being independently moveable relative to the center section about the pivotal connection with the center section, means for mounting the central section of the boom assembly on the vehicle for pivotal movement of the boom assembly from the spreading position upwardly and forwardly to the transport position, power means to control the pivotal movement of the boom assembly, power means for independently moving the right and left sections upwardly and downwardly when the boom assembly is in the spreading position and for moving the right and left sections forwardly when the boom assembly is in the transport position, and means for conveying material discharged from the material storage means to selected points along the boom assembly to distribute the material.

2. The spreading apparatus of claim 1 in which the center section of the boom assembly includes a main support that provides the pivotal connection for the mounting of the boom assembly, the pivotal connection being about a horizontal axis transverse to the direction of travel of the vehicle, which axis is located at the upper end of the main support.

3. The spreading apparatus of claim 2 in which the central section of the boom assembly also provides support for the means for conveying the material from the material storage means to selected points along the boom assembly.

4. The spreading apparatus of claim 1 in which the means for conveying the material discharged from the material storage means to selected points along the boom assembly includes a plurality of tubes, each tube having a discharge opening positioned at selected points spaced along both the right and left sections of the boom assembly.

5. The spreading apparatus of claim 4 in which each of the right and left sections of the boom assembly has a rearward portion that extends both outwardly and forwardly at an acute angle to the direction of travel of the vehicle, the discharge openings of each of the tubes being positioned on the rearward portion so that the discharge openings are staggered forwardly and rearwardly of each other.

6. The spreading apparatus of claim 1 in which the central section of the boom assembly includes locking means that positively locks the boom assembly in a transport position.

7. The spreading apparatus of claim 6 in which the locking means includes a locking bar pivotally mounted on the vehicle at a point beneath the pivotal connection of the boom assembly to the vehicle, the locking bar extending rearwardly and outwardly and having a locking notch near its outer end, and a locking pin is positioned on the boom assembly beneath the locking bar so that as the boom assembly pivots upwardly and rearwardly the locking notch will engage the locking pin when the boom assembly in the transport position.

8. Apparatus for distributing material and adapted to be mounted on the rear of a vehicle of the type having storage means for the material to be distributed and means for conveying the material from the storage means through a discharge opening, said apparatus comprising a boom assembly, means for mounting the boom assembly on the vehicle so that the boom assembly extends outwardly from the vehicle to right and left sides of the vehicle, said boom assembly supporting a plurality of separate air ducts each having an inner end positioned near the discharge opening and each extending outwardly along the boom assembly in substantially a straight line to a discharge end, some of the ducts extending to the right side of the boom assembly and some of the ducts extending to the left side of the boom assembly, the inner ends of the ducts extending to the right side being spaced apart in a generally horizontal plane to receive alternate ones of the inner ends of the ducts extending to the left side, the discharge ends of the ducts being positioned at spaced selected intervals along both the right and left sides of the boom assembly, means at each of the discharge ends of the ducts for directing the material generally rearwardly, first air moving means discharging into the inner ends of the ducts extending to the left side, second air moving means discharging into the inner ends of the ducts extending to the right side, said first and second air moving means each being positioned so that the direction of air flow is in substantial alignment with the respective ducts into which the air is discharged, material dividing means adapted to be positioned near the discharge opening of the material storage means of the vehicle and directly over the inner ends of the air ducts to receive the material from the storage means and direct the material by gravity into the air ducts at a point downstream from the respective air moving means, and separate material tubes connected between the material dividing means and the inner ends of all the ducts, one such material tube for each duct.

9. The apparatus of claim 8 in which the first air moving means is positioned to the right of the material dividing means and the second air moving means is positioned to the left of the material dividing means.

10. The apparatus of claims 7 or 8 in which the material dividing means includes a plurality of vertically extending members substantially equally spacedapart transversely to the flow of material being discharged from the discharge opening of the material storage means, said members extending near the discharge opening and defining compartments to receive substantially equal amounts of material discharged from the material storage means, movement of the material from the compartment to the air ducts being by gravity and without the aid of mechanical means.

* * * * *